United States Patent [19]

Tzavos

[11] 4,172,880

[45] Oct. 30, 1979

[54] PROCESS AND APPARATUS FOR AUTOMATICALLY CONTROLLING THE ACID CONCENTRATION IN GAS SCRUBBING SOLUTION

[75] Inventor: William C. Tzavos, Chicago, Ill.

[73] Assignee: Pettibone Corporation, Chicago, Ill.

[21] Appl. No.: 919,622

[22] Filed: Jun. 27, 1978

[51] Int. Cl.² .............................................. B01D 53/34
[52] U.S. Cl. .................................... 423/210; 423/224; 423/236; 423/238; 423/245; 55/19; 137/5; 137/93; 422/4; 422/5; 422/62; 422/105; 422/111
[58] Field of Search ............... 423/210, 224, 245, 232, 423/238, 242 A, 236; 55/18, 19; 137/5, 93; 164/12, 16, 76; 422/3-5, 62, 105-108, 110, 111

[56] References Cited

U.S. PATENT DOCUMENTS

| 1,450,023 | 3/1923 | Edelman ................................. 137/5 |
| 2,113,198 | 4/1938 | Nonhebel et al. ................ 423/242 A |
| 3,844,303 | 10/1974 | Moon et al. .............................. 137/5 |
| 4,002,722 | 1/1977 | Suzuki et al. ......................... 423/238 |

*Primary Examiner*—Earl C. Thomas
*Attorney, Agent, or Firm*—Darbo & Vandenburgh

[57] ABSTRACT

Optimum concentration of the acid-scrubbing solution employed in a scrubbing tower for removal of malodorous and/or toxic gases from the air is maintained automatically in a control system which senses the electrical conductivity of the solution to control acid-feeding apparatus. High and low concentration alarms are also provided to warn of malfunction.

20 Claims, 3 Drawing Figures

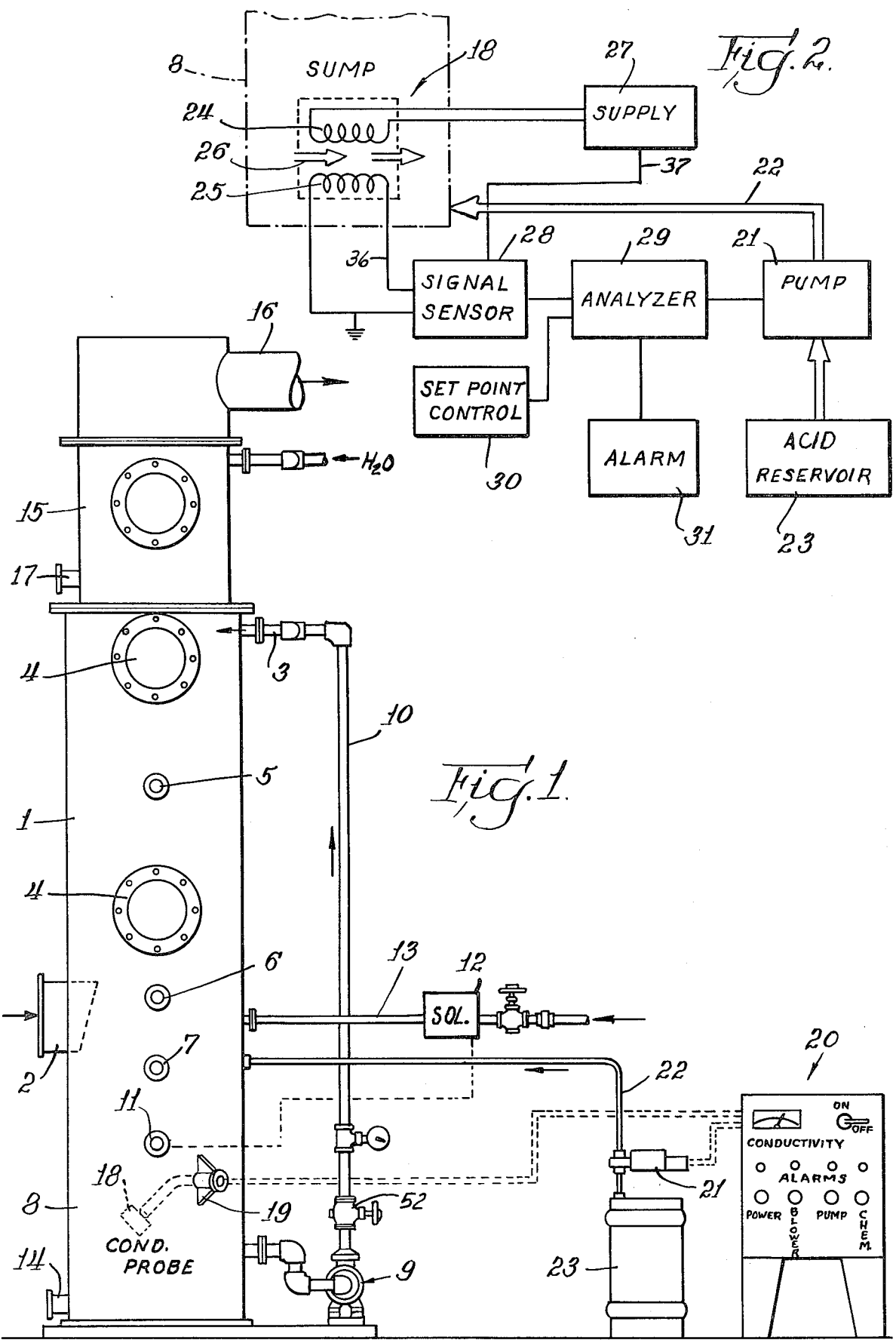

PROCESS AND APPARATUS FOR AUTOMATICALLY CONTROLLING THE ACID CONCENTRATION IN GAS SCRUBBING SOLUTION

BACKGROUND AND SUMMARY OF THE INVENTION

Many industrial operations generate malodorous and/or toxic gases which, in years gone by, have merely been exhausted to the atmosphere. Such pollution of the atmosphere is no longer permitted and it is necessary to remove or otherwise render innocuous the gaseous pollutants. Although, in recognition of the frequently inordinate expense of completely removing such pollutants, it is permissible to discharge air containing less than officially specified minimal amounts of such pollutants to the atmosphere, it is nevertheless desirable to remove the obnoxious gases from a carrier air stream to such an extent that the scrubbed air can be exhausted into the space within the industrial building structure. This is especially important in geographical locations where atmospheric temperatures may deviate greatly from temperatures maintained within the industrial buildings since air exhausted to the atmosphere must be replaced by air coming in from outside of the building which air must then be heated or cooled as required to maintain the desired interior temperatures. Thus, substantial energy and costs may be saved by treating the polluted air to a degree sufficient to render interior exhausting permissible.

Air scrubbing towers are well known and generally include a body comprised of pieces or forms of inert solid material, usually referred to as the "pack" or "fill" which provides very large surface areas kept wet by scrubbing solution which is sprayed downwardly upon the pack as the air is passed upwardly, passing over the wet surfaces for reaction of the contaminant gases with the scrubbing liquid whereafter the air passes through a demister and is discharged from the tower at its top. Provision is made for a liquid sump at the bottom of the tower from which scrubbing liquid is drawn for recirculation by means of a pump to the sprayers and thence again downwardly through the pack. Means must be provided for replenishing water evaporated from the scrubbing solution and to maintain the effective and otherwise optimum acid composition of the solution. These solution servicing functions may be manual, but, in accordance with the invention herein described, both the provision of make-up water and the maintenance of the concentration of the scrubbing solution are fully automatic.

As an example of an industry which presents very serious problems of air pollution, reference may be made to the metal casting industry, especially the shell and core mold making operations which generate very offensive odors but also the casting operations, themselves, which also create polluting gases. The principal foundry air contaminants include triethyl amine, dimethylethyl amine, carbon dioxide, ammonia, formaldehyde, phenols, hydrogen cyanide and other materials in trace quantities. The odoriferous and noxious gaseous contaminants are removed by reaction with sulfuric acid as the air stream carrying the same passes through the scrubbing tower provided with pack continuously wetted by sulfuric acid solution. For maximum cleansing of the air, a tower comprising two, or even more, pack treatment bodies in series may be employed. As noted above, the additional cost of such series treatments can be justified by the savings realizable by discharging the scrubbed air inside of the foundry building.

The principal object of the invention is to provide an air scrubbing tower system wherein gaseous pollutants carried by the air are removed by acid scrubbing solution which solution is automatically maintained at the predetermined level or range of concentration for optimum operation and results. A further object is to provide such a tower system wherein the acid concentration is controlled by a control system which senses the conductivity of the scrubbing solution to effect the feeding of additional acid as required.

A further object is to provide alarms activated at predetermined maximum and minimum levels of concentration of the acid solution to call for manual rectification of a malfunction.

More specifically, an object of the invention is to provide a fully automatic acid scrubbing tower for air-polluting by-products generated in the various operations of the metal casting industry to remove the pollutant gases to such a degree that the treated air may be discharged from the tower interiorly of the building structure.

DESCRIPTION OF THE DRAWINGS

In the accompanying drawings,

FIG. 1 is a general elevational view of a typical gas scrubbing system embodying the invention;

FIG. 2 is a system flow diagram including a block diagram of the acid concentration control system of the scrubbing system of FIG. 1.

DESCRIPTION OF EXAMPLE EMBODYING BEST MODE OF INVENTION

Figure 3:
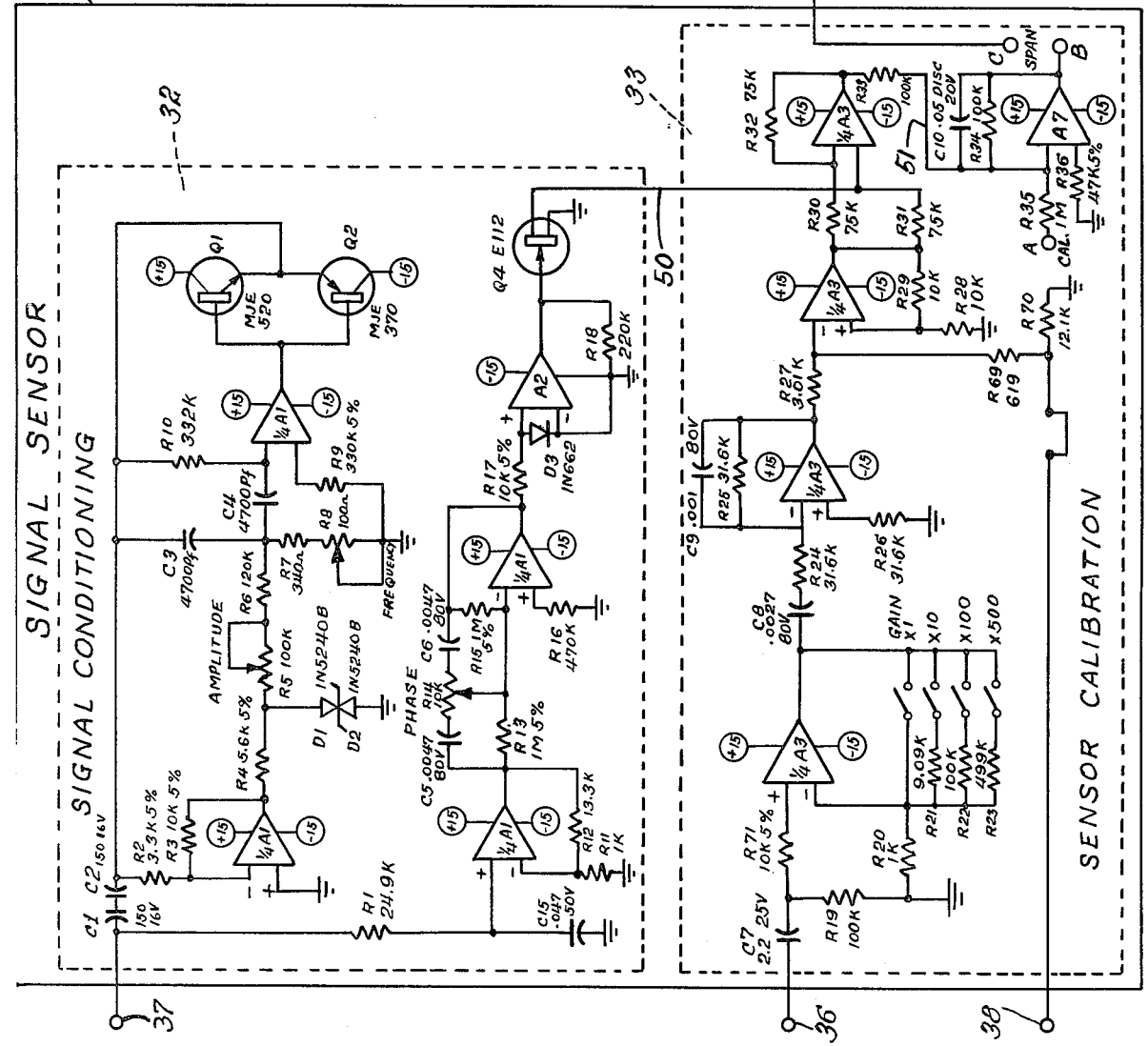
FIG. 3 is a schematic representation of the analyzer circuit depicted generally in FIG. 2.

Although the gas scrubber system of the invention has proved in practice to be very satisfactory in carrying out its function, it is, of course, subject to limitations, particularly with respect to the nature of the pollutant gases which are to be removed from the air stream. The following discussion indicates the nature of the problem conditions with which the system is capable of coping satisfactorily and guidelines are provided by which persons with reasonable skill in the art can determine whether a particular application can be handled with at least reasonable success.

The scrubbing tower, per se, employed in the scrubber system of the invention is essentially conventional. The key to the successful operation of the system resides in the continuous and automatic maintenance of the acid scrubbing solution in optimum condition from the standpoints of efficiency of pollutant removal and also economy of operation. The essence of this invention is directed to the realization that in a scrubbing tower for the removal of pollutant gases from an air stream, the conductivity of a scrubbing solution can be used to accurately monitor and concentration of the scrubbing solution. This is effected by the control system which senses the conductivity of the scrubbing solution as a measure of concentration and controls chemical reagent feeding equipment accordingly.

In the scrubber systems with which this invention is concerned, the optimum condition of the scrubbing solution relates directly to the concentration of the acid solution, and since, as noted, the control system is directly responsive to the electrical conductivity of the scrubbing solution, it necessarily follows that the measured conductivity must be that which is imparted by the presence of the reagent acid in the water of the solution. It is known that there is a direct relationship between the degree of concentration of the acid solution and the electrical conductivity of the solution, particularly at low levels of pH, approximately 2.0 pH and below. This relationship is basic to the mode of operation of the acid concentration control system of the present invention. The presence of other materials in the solution may be tolerated only if the quantity and dissociation characteristics are such that they do not affect the electrical conductivity of the solution to such an extent that they interfere with the maintenance of the optimum range of acid concentration. For this reason, the pollutants found in industrial air streams must be measured in quantity and their dissociation characteristics considered to determine whether contamination of the acid scrubbing solution by the products of reaction of the acid and the gaseous pollutants is so great as to interfere with the successful control of the concentration of the acid in the scrubbing solution which responds to the conductivity of the solution. Another factor to consider involves the rate at which the scrubbing solution may be discarded to limit the concentration of the pollutant gas reaction products. This consideration involves cost and the problems of disposition of the spent scrubbing solution.

In the case of the use of the scrubber system of the invention to remove polluting gases in foundry operations, it has been found that the system is not only feasible, but is highly satisfactory from the standpoints of both cost and removal efficiency. In such a system, the reaction products of the pollutants in the sump solution do not contribute to the conductivity of the solution by more than 5% even under extreme conditions.

The gas scrubber illustrated in FIG. 1 comprises a conventional tower housing 1 containing the fill, not shown, between air inlet 2 and the usual spray heads, not shown, supplied by acid scrubber solution inlet 3, and a demister, not shown, above the spray heads for removal of entrained liquid particles prior to discharge of the air into the wash section 15. The usual access doors 4, test rod 5, flush door 6 and overflow 7 are provided. The bottom portion 8 of tower housing 1 defines a sump into which the scrubbing solution drains and from which the solution is drawn by pump 9 for recycling of the scrubber solution through supply pipe 10. A float switch 11 is installed to maintain the level of the acid scrubber solution in the sump, the float switch being electrically connected with a solenoid valve 12 in make-up water line 13. A sump drain 14 is provided to discharge scrubber solution as required.

Wash section 15 of tower 1 includes fill or pack, not shown, and spray heads, not shown, for spraying water downwardly into the fill as the air is discharged from the scrubbing section for renewal of acid mist which may remain in the air stream after it passes through the first demister. The wash section also includes a demister for removing liquid droplets from the cleansed air before it is discharged through outlet 16.

While the system, as shown, includes a water wash with a drain 17 for discharging water from the wash section, it will be understood that an alkaline solution could be utilized to enhance the washing procedure by neutralizing the acid. Drain 17 would then be connected to a recirculating system for recirculating the alkaline solution through the wash section.

An adjusting valve or cock 52 may be provided in the scrubber solution supply pipe 10 to properly proportion the amounts of solution supplied to the spray heads of the scrubber unit.

For purposes of the invention which contemplates high pollutant gas removal, a duplex scrubber may be employed. A second scrubbing tower, not shown, may be mounted in tandem with tower housing 1 for the flow of air being scrubbed upwardly through the main tower of housing 1 and then through the second scrubber. This second scrubber in series contains the component parts above described. Of course, only the last scrubbing tower in series would require a wash section.

In accordance with the invention, an acid concentration control system is provided for the automatic maintenance of the desired level of concentration of the acid scrubber solution between predetermined limits. This system is designed to operate in response to the electrical conductivity of the scrubber solution and includes a conductivity sensor 18 mounted by suitable means in the bottom portion 8 of housing 1 so that the sensor is immersed within the scrubber solution sump. The sensor is electrically connected to electronic control equipment, indicated generally at 20. A system flow diagram including a block diagram of the electronic control equipment is shown schematically in FIG. 2. The function of the electronic control equipment is to control the operation of acid feed pump 21 which is connected in acid supply line 22 which connects a reservoir of acid, such as carboy 23, with the interior of tower housing 1. The control equipment also energizes visual and/or aural alarms to call for manual attention in the event of malfunction.

The acid concentration control system as shown in FIG. 2 includes an electrodeless conductivity sensor 18 of known construction and mode of operation, comprising a pair of single winding toroidal coils 24 and 25 arranged in parallel with provision for the flow of scrubber acid solution continuously through them. The electrodeless sensor is desirable over more conventional electrode-type sensors because the collection of ions on the sensor is minimized, thus ensuring accurate readings. The concentration of the solution may be measured by determining the difference between the voltage drop in reference coil 24, supplied by voltage supply 27, and that of receiving coil 25 and comparing this to a present reference. It will, of course, be understood that the power for supply 27 and other powered components of the system, such as pump 21, will be from an external source such as, by way of example, standard house supply lines or the like.

In the example shown and described herein, a reference voltage $V_1$ is supplied across reference coil 24 by power supply 27. As indicated by arrows 26, the acid scrubber solution continuously flows through the coils 24 and 25 and forms a conducting path therebetween. When the level of concentration of acid in the solution decreases as the acid reacts with pollutant gases in the pack section of the tower, the conductivity of the solution decreases accordingly. Conversely, when the level of concentration of the acid increases, a higher solution conductivity results. Thus, the voltage $V_2$ induced in the receiving coil 25 is proportional to the level of concentration of acid in the scrubber solution.

The voltage $V_2$ is input to sensor circuit 28 and conditioned relative to a control signal from supply 27 input at 37. The sensor circuit 28 generates a conditioned, rectified output $V_O$ which is proportional to the difference between the control signal and $V_2$ and this output $V_O$ comprises one input into an analyzer circuit 29. The other input to the analyzer circuit 29 is provided by the set point control 30, which generates a signal $V_R$ representing the desired level of conductivity of the solution.

The analyzer 29 includes a comparator circuit which operates in well-known manner for determining the precise level of concentration of acid in the scrubber solution by comparing the conditioned output voltage $V_O$ with the set point reference voltage $V_R$. As $V_O/V_R$ increases, a higher level of concentration is indicated. Conversely, as $V_O/V_R$ decreases a lower level of concentration is indicated.

Of course, the output voltage $V_O$ can be directly converted to conductivity in micromhos by simple mathematics utilizing the basic law of electricity:

$$1/R = A/V,$$

when the current A is a constant, as in the present case.

In the present example, using sulfuric acid, when the conductivity of the solution is between 45,000 and 95,000 micromhos, the level of concentration of sulfuric acid in the solution is considered to be at an acceptable level. To stay on the safe side, the analyzer energizes the control for pump 21 whenever the conductivity of the solution drops to 50,000 micromhos, thereby effecting the pumping of additional sulfuric acid from reservoir 23 into the sump for increasing the concentration of sulfuric acid in the sump solution. The pump continues to pump sulfuric acid into the solution until the conductivity of the solution reaches a safeside limit of 90,000 micromhos. At this point, the analyzer senses this level of conductivity by comparing $V_O$ and $V_R$ and de-energizes the pump, thereby stopping the flow of sulfuric acid from the reservoir into the sump. The pump remains de-energized until the analyzer again senses a conductivity level of 50,000 micromhos, at which time the pump is activated.

It may also be desirable to include a visual and/or aural alarm system 31 which is triggered by the analyzer circuit 29 whenever the conductivity level of the solution reaches either of the acceptable limits, in our example, 95,000 micromhos or 45,000 micromhos, respectively, indicating a system malfunction.

It should, of course, be understood that the various limits may be preset at any desired level which give satisfactory air cleansing results for a particular application.

The particular circuitry for implementing the flow of sulfuric acid by energizing the pump 21 and for activating the alarm 31 is a matter of choice. By way of example, uniformly satisfactory results have been achieved by utilizing the particular circuitry illustrated in detail in FIG. 3. As there shown, the signal sensor 28 comprises conditioning circuitry 32 and calibration circuitry 33 which conditions and calibrates the voltage signal $V_2$ sensed by the second toroidal coil 25 and provides a variable d.c. voltage output $V_O$ at 34 which accurately represents the conductivity of the solution. In essence, an a.c. control signal from supply 27 is input to the conditioning cicuit at 37 for producing a control signal at transistor Q4 and on line 50. An a.c. signal $V_2$ produced by coil 25 is input to the conditioning circuit 28 at 36 and amplified and phase shifted 90° to provide a rectified, amplified signal proportional to $V_2$. This signal is combined with the control signal on line 50 to produce an uncalibrated output signal on line 51 which is proportional to the signal $V_2$ and therefore proportional to the conductivity of the scrubbing solution. This signal is then calibrated to generate $V_O$, a variable d.c. signal proportional to solution conductivity.

Essentially the conditioning circuitry and sensor calibration circuit collectively amplify, rectify and scale the sensed signal $V_2$ in well-known manner, to generate a conditioned, steady, variable d.c. voltage output $V_O$ at 34. The conditioning is, of course, required to ensure the production of a signal $V_O$ which is free of interference which may have an adverse effect on the system response.

As in any case where theoretical principles are put into commercial use, calibration in the field is necessary to compensate for environmental conditions unique to each particular application. The present system is calibrated in the typical manner by first reading the conductivity of air with the sensor 18 and adjusting calibration circuitry at A (not shown) so that meter M1 reads zero. The sensor 18 is then submerged in a test solution of known conductivity and meter M1 is again read. The span of the meter is then adjusted to give the proper conductivity reading by adjusting span control circuitry at B and C, (not shown). The particular circuitry utilized for adjusting the calibration and span may be of any well-known design and as such is not an essential feature of applicant's invention.

In addition, it has been found that many sensing devices are affected by changes in temperature. Therefore, many such sensing devices include a temperature sensitive resistor (not shown) which generates another input to the sensor circuit at 38 for further modifying the conditioned output $V_O$ in accordance with thermal conditions in the tower 8.

Thus, the conditioned output $V_O$ of the sensor circuit represents a fully compensated, accurate signal defining the conductivity of the tower solution at any given moment.

The condition output $V_O$ is input to the analyzer circuit 29 at amplifier A4, after which it is combined with a preset d.c. voltage signal $V_R$ which represents the desired set point of operation as set at set point control circuit 30, see FIG. 2. The voltage $V_R$ is proportional to and accurately indicates the optimum conductivity level of the solution. The set point voltage signal $V_R$ and the conditioned output $V_O$ of the sensor circuit are compared at amplifier A5 of the pump energization circuit to energize the pump relay 39 (not shown) which is in the analyzer and activates the pump 21 whenever the voltage $V_O$ falls below the voltage $V_R$, indicating that the conductivity of the solution has fallen below the desired level.

Conversely, whenever $V_O$ is greater than $V_R$, the amplifier A5 ceases production of the relay drive signal, de-energizing the pump relay 39 and deactivating pump 21.

It will be readily understood that it would be undesirable to have the relay 39 and hence the pump 21 instantaneously respond to conductivity conditions as soon as the solution drops slightly below or rises slightly above the specific optimum level. Therefore, a built-in "dead band" or hysteresis is provided by feeding a portion of the amplifier A5 output back through a feedback resistor R64 to the input side of the amplifier.

The value of resistor R64 is critical for any given application since it is desired that the hysteresis be limited to a predetermined percentage range of full range capability. Of course, the particular value for resistor R64 in any given instance is dependent upon desired concentration of system conditions and load. Given these factors, the value of resistor R64 may be readily calculated by known methods. It is to be noted that known systems typically provide for a hysteresis of 10%–15% of full range and thus are not readily adaptable for use in the present control circuitry. By way of example, the present system generally allows a 40%–60% hysteresis for a full range control having a span of 0–120,000 micromhos.

This predetermined hysteresis eliminates the possibility of pump 21 being forced into a continuous instantaneous on-off or "flutter" condition. For example, if the optimum conductivity of the solution for a particular application is 70,000 micromhos, commercially satisfactory results may be achieved as long as the conductivity of the solution is maintained between 45,000 and 95,000 micromhos. Thus, the dead band feedback circuit may be preset to make amplifier A5 activate the pump whenever the solution conductivity falls to a safe-side low limit of 50,000 micromhos and deactivate the pump 21 whenever the conductivity reaches a predetermined high limit of 90,000 micromhos.

As will be noted from FIG. 3, a light-emitting diode D4 is included in parallel with the drive circuit of pump relay 39 to provide a visual indication whenever the pump is activated.

Meter M1 is provided at the output of amplifier A4 to give a visual reading of the solution conductivity in micromhos at any given instant as represented by the conditioned sensor voltage $V_O$. Thus, an operator can readily determine whether the solution conductivity is within the operating range, 50,000–90,000 micromhos in the present example.

An additional safeguard my be provided by utilizing an alarm 31, as shown in FIG. 2. Alarm energization circuitry 40 is then provided in the analyzer 29 to energize the alarm relay 41 (not shown) and activate the alarm 31 under appropriate conditions. In the example described, it is desirable that an alarm be activated whenever the conductivity of the solution exceeds the high acceptable limit of 95,000 micromhos or drops below the low acceptable limit of 45,000 micromhos. The conditioned sensor output voltage $V_O$ is input to the alarm energization circuit at 42, where it is introduced into separate input sides of the split amplifier A6. A second input to the alarm energization circuit is provided at 44, representing the high conductivity limit by means of a preset d.c. voltage signal. The third input at 46 represents the low conductivity limit by means of another preset d.c. voltage signal. The high and low limits will, of course, vary with particular applications.

The signal $V_O$ and the high limit signal at 44 are combined at one side of amplifier A6 to produce a signal at 48 whenever the conductivity of the solution in our example exceeds 95,000 micromhos. The signal $V_O$ and the low limit signal at 46 are combined at the other side of amplifier A6 to produce a signal at 50 whenever the conductivity of the solution in our example drops below 45,000 micromhos. As can be seen by reference to FIG. 3, the presence of a signal at either 48 or 50 energizes the alarm relay 41 for activating the alarm, indicating system malfunction. A light-emitting diode D7 is included in parallel with the circuit for driving relay 41 and provides a visual alarm, as well.

It will, of course, be understood that the various high and low limits, "dead band" hysteresis and set points will vary dependent upon particular applications, and that the precise limits are determined by the results desired and by the specific environmental conditions. Further, the amount of acceptable dead band will also vary with respect to the load, i.e., the level of pollutants to which the tower solution is subjected.

The particular circuitry shown in FIG. 3 is designed for use in conjunction with a dual toriod, electrodeless sensor, Model No. 75, manufactured by Great Lakes Instruments, Inc., Milwaukee, Wisconsin, wherein all of the resistors are 1% unless otherwise noted in FIG. 3; all potentiometers are Bourns No. 3389P; all capacitors are in microfarads unless noted in FIG. 3; amplifiers A1, A3, A4 and A7 are Model No. 4136 (Quad 741), manufactured by Motorola Corporation, Chicago, Illinois; amplifiers A2 and A5 are Model No. AO 301A, and amplifier A6 is Model No. 4558 DN, both manufactured by Texas Instruments, Incorporated, Houston, Tex.

It will be understood that after preliminary studies of the relevant factors bearing on the feasibility of polluted air scrubbing by means of the invention as above described, it is necessary that the design engineers establish operating specifications for the system. The kind of acid that will be most effective for reaction with gaseous pollutants to effect their removal must be determined; also, the concentration of the acid scrubbing solution required for the chemical reactions that must be brought about in the course of the scrubbing operation. In this connection, the extent to which the pollutants must be removed is taken into account. Then an acceptable acid concentration range should be established, the lower limit being that at which the scrubbing solution is sufficiently effective in removing the gaseous pollutants to meet the requirements of the particular installation, the upper limit being that considered adequate to provide a factor of safety for operation during peak loads of pollutants and also taking into account economy of operation and such practical matters as equipment corrosion.

After these concentration determinations have been made, they are converted to conductivity equivalents by reference to standard charts or graphs and with this information the conductivity set points may be established for the acid concentration control system. As above explained, alarm set points are also established in relation to the concentration limits.

Because pollutant/acid reaction products are continuously added to and dissolved by the scrubbing solution, provision must be made for limiting the level of such materials in the solution. For this purpose, a specified amount of the solution may be discharged periodically, being replaced automatically by water and acid input, or the tower system may be shut down and all of the solution discharged and replaced by fresh acid solution. The choice of one procedure or the other will depend upon the particular conditions under which the scrubbing system must operate.

The specific example of a scrubbing system for foundry air cleaning involves the maintenance of sulfuric acid scrubbing solution in the range 2%–6% by weight of sulfuric acid. This range was determined on the basis of the guidelines above described and has been found to be very satisfactory. It should be noted that it is possible to adjust the acid solution conductivity set points as may be indicated by results actually achieved in the operation of scrubber systems as conditions may change from time to time or as actual inplant operation indicates the desirability of some deviation from design specifications.

It has been found that the use of conductivity of the scrubbing solution as the controlling condition for operation of the automatic control of the scrubber solution is highly dependable as compared with control systems which sense the pH of the solution. This is particularly true in tower systems which require acidity at the level of 2.0 pH and lower. As a dynamic system in which scrubbing solution is continuously circulated through the conductivity sensing probe, the control system of the invention is entirely free from the familiar "acid error" which is essentially an error-introducing effect experienced as surface layer phenomena under essentially static ambient conditions such as those which obtain with the use of pH sensing probes. The conductivity monitoring system of the invention is characterized by a high degree of stability over relatively long periods of time. Recalibration is usually not required in less than six month intervals in contrast to the necessity of calibration checks of pH systems on a weekly basis in industrial applications. Also, shutdowns necessitated by damage to the more fragile pH probes, as compared with the rugged electrodeless conductivity probes, are avoided.

Thus, the conductivity monitoring control system of the invention provides dependable control of the activity of the scrubbing solutions over large periods of continuous operation of the scrubbing towers with consequent minimum operating costs.

I claim:

1. An improvement in a device for removing malodorous and/or toxic gases from contaminated air by subjecting the contaminated air to a scrubbing solution containing an acid electrolytic reagent sufficient in concentration to react with and remove the malodorous and/or toxic gases from the air, the device being of the type including means for directing the contaminated air in an upward stream through a scrubbing tower containing an inert fill, means for simultaneously directing the scrubbing solution downwardly through the tower and fill, a sump in the lower portion of the tower for collecting the scrubbing solution, and means for discharging the cleansed air at the top of the tower, wherein means are provided for recirculating and again directing the collected scrubbing solution downwardly through the tower, the improvement comprising:
   (A) means for monitoring the level of concentration of the acid electrolytic reagent in the scrubbing solution to maintain the acid concentration at a predetermined level not exceeding approximately pH 2.0 by continually sensing the conductivity of the scrubbing solution;
   (B) means for converting the sensed values of conductivity to control signals, and
   (C) means for activating acid feeding equipment to feed acid to the scrubbing solution responsive to said control signals to maintain the solution within said predetermined concentration range.

2. A device as called for in claim 1, which further includes:
   (D) means for establishing high and low limits of acceptable concentration and corresponding high and low limits of conductivity of the scrubbing solution;
   (E) means for initiating feeding of acid to the solution whenever the conductivity approaches the low limit and
   (F) means for discontinuing addition of acid to the solution whenever the conductivity approaches the high limit.

3. A device as called for in claim 2, which further includes:
   (G) means for activating an alarm system whenever the conductivity of the solution falls outside the predetermined acceptable range as defined by the high and low limits.

4. A device as called for in claim 1, wherein the monitoring means comprises:
   (i) an electrodeless sensor submerged in the solution in the tower sump, said sensor comprising sending and receiving units spaced apart in parallel with provision for continuously passing the solution therebetween and
   (ii) means for supplying a reference signal to the sending unit, whereby a resulting signal is generated in the receiving unit, the difference between the reference signal and the resulting signal being proportional to the conductivity of the solution passing between said units.

5. A device as called for in claim 4, wherein the electrodeless sensor comprises a pair of spaced-apart toroid coils in parallel and disposed in the receptacle such that the solution continuously flows through the space between said coils.

6. A device as called for in claim 4, further including:
   (H) means for comparing the resulting signal with a preset signal representing the optimum concentration of the solution; and
   (I) means for establishing a high and a low signal representing the limits of a range above and a range below the preset signal for defining acceptable high and low limits of solution concentration, wherein the said activating means comprises:
   (i) means for initiating feeding of acid into the solution to increase the concentration of the solution when the resulting signal approaches the low signal;
   (ii) means for discontinuing feeding of acid into the solution when the resulting signal approaches the high signal.

7. A device as called for in claim 6, which further includes:
   (J) means for activating an alarm system whenever the resulting signal is outside the signal range defined by the high signal and the low signal.

8. A device as called for in claim 1, wherein the conductivity of the solution is partially dependent upon the temperature of the solution, wherein the monitoring means includes means for adjusting the monitored conductivity to compensate for thermal conditions.

9. A device as called for in claim 1, wherein the scrubbing tower includes a wash section disposed above the means for directing the scrubbing solution, for removing carry over acid from the air before discharging same from the tower.

10. An improvement in the method of removing malodorous and/or toxic gases from contaminated air by subjecting the contaminated air to a scrubbing solution containing an acid electrolytic reagent sufficient in concentration to react with and remove the malodorous and/or toxic gases from the air, the method being of the type including the steps of directing the contaminated air in an upward stream through a scrubbing tower containing an inert fill while simultaneously directing the scrubbing solution downwardly through the tower and fill, thereafter collecting the scrubbing solution in a sump in the lower portion of the tower and discharging the cleansed air at the top of the tower, wherein the collected scrubbing solution is recirculated and again directed downwardly through the tower, the improvement comprising the steps of:
- (A) monitoring the level of concentration of the acid electrolytic reagent in the scrubbing solution to maintain the acid concentration at a level not exceeding approximately pH 2.0 by continually sensing the conductivity of the scrubbing solution;
- (B) converting the sensed values of conductivity to control signals, and
- (C) activating acid feeding equipment to feed acid to the scrubbing solution responsive to said control signals to maintain the solution within a predetermined concentration range.

11. A method as called for in claim 10, which includes the additional steps of:
- (D) establishing high and low limits of acceptable concentration and corresponding high and low limits of conductivity of the scrubbing solution;
- (E) initiating feeding of acid to the solution whenever the conductivity approaches the low limit and
- (F) discontinuing addition of acid to the solution whenever the conductivity approaches the high limit.

12. A method as called for in claim 11, which includes the additional step of:
- (G) activating an alarm system whenever the conductivity of the solution falls outside the predetermined acceptable range as defined by the high and low limits.

13. A method as called for in claim 10, wherein step (A) comprises:
- (i) submerging in the solution in the tower sump an electrodeless sensor comprising a spaced-apart sending unit and receiving unit in parallel with provision for continuously passing the solution therebetween
- (ii) applying a reference signal to the sending unit; and
- (iii) generating a resulting signal in the receiving unit, the difference between the reference signal and the resulting signal being proportional to the conductivity of the solution passing between said units.

14. A method as called for in claim 13, wherein the electrodeless sensor comprises a pair of spaced-apart toroid coils in parallel and disposed in the receptacle such that the solution continuously flows through the space between said coils.

15. A method as called for in claim 13, comprising the additional steps of:
- (H) comparing the resulting signal with a present signal representing the optimum concentration of the solution; and
- (I) establishing a high signal and a low signal representing the limits of a range above and a range below the preset signal for defining acceptable high and low limits of solution concentration, wherein step (C) comprises:
- (i) initiating feeding of acid into the solution to increase the concentration of the solution when the resulting signal approaches the low signal;
- (ii) discontinuing feeding of acid into the solution when the resulting signal approaches the high signal.

16. A method as called for in claim 15, which includes the step of:
- (J) activating an alarm system whenever the resulting signal is outside the signal range defined by the high signal and the low signal.

17. A method as called for in claim 10, wherein the conductivity of the solution is partially dependent upon the temperature of the solution, wherein step (A) includes adjusting the monitored conductivity to compensate for thermal conductions.

18. A method as called for in claim 10, wherein the scrubbing tower comprises two scrubbing sections disposed in tandem relationship to each other whereby the air is subjected to a series of scrubbing treatments before being discharged from the tower.

19. A method of cleansing air of malodorous and/or toxic gases by subjecting air so contaminated to a sulfuric acid scrubbing solution of a predetermined concentration not less concentrated than pH 2.0 and corresponding conductivity, the method comprising the steps of:
- (A) establishing high and low limits of acceptable concentration and corresponding conductivity of the acid scrubbing solution;
- (B) monitoring the conductivity of the scrubbing solution and electronically comparing it with the acceptable range of conductivity defined by the high and low limits;
- (C) initiating feeding of acid into the scrubbing solution to increase the concentration and corresponding conductivity thereof when the monitored conductivity approaches the low limit; and
- (D) discontinuing the flow of acid into the scrubbing solution when the monitored conductivity approaches the high limit.

20. A method as called for in claim 19, comprising the step of activating an alarm system whenever the conductivity of the scrubbing solution falls outside the acceptable conductivity range defined by the high and low limits.

* * * * *

UNITED STATES PATENT AND TRADEMARK OFFICE
CERTIFICATE OF CORRECTION

PATENT NO. : 4,172,880
DATED : October 30, 1979
INVENTOR(S) : William C. Tzavos

It is certified that error appears in the above-identified patent and that said Letters Patent are hereby corrected as shown below:

| | |
|---|---|
| Col. 2, l. 61 | "and" should be --the-- |
| Col. 4, l. 7 | insert "the" after "For" |
| Col. 4, l. 49 | "present" should be --preset-- |
| Col. 6, l. 7 | "circuit" should be --circuitry-- |
| Col. 6, l. 10 | "The" should be --This-- |
| Col. 8, l. 10 | "toriod" should be --toroid-- |
| Col. 9, ls. 29,30 | "activity" should be --acidity-- |
| Col. 10, l. 19 | insert a comma (,) after "therebetween" |
| Col. 12, l. 3 | "present" should be --preset-- |
| Col. 12, l. 26 | "conductions" should be --conditions-- |

Signed and Sealed this

Nineteenth Day of February 1980

[SEAL]

Attest:

SIDNEY A. DIAMOND

Attesting Officer

Commissioner of Patents and Trademarks